Aug. 19, 1969    A. DIEDERICHS ET AL    3,461,528
METHOD OF PRODUCING A ROTARY JOINT BETWEEN AT LEAST TWO MEMBERS
HAVING A ROTATIONALLY SYMMETRICAL CONSTRUCTION AT THE JOINT
Filed Sept. 14, 1966

United States Patent Office 3,461,528
Patented Aug. 19, 1969

3,461,528
METHOD OF PRODUCING A ROTARY JOINT BETWEEN AT LEAST TWO MEMBERS HAVING A ROTATIONALLY SYMMETRICAL CONSTRUCTION AT THE JOINT
Artur Diederichs and Wolfgang Pieper, Wurzburg, Germany, assignors to Siemens Aktiengesellschaft, Erlangen, Germany, a corporation of Germany
Filed Sept. 14, 1966, Ser. No. 579,346
Claims priority, application Germany, Sept. 14, 1965, S 99,399
Int. Cl. F16n 15/00
U.S. Cl. 29—149.5       11 Claims

ABSTRACT OF THE DISCLOSURE

Method of producing a lubricated rotary joint between two members having rotationally symmetrical construction at the joint location includes coating one of the members with a layer of lubricating material having a thickness corresponding to the spacing between the two members and deforming one of the members about the other by means of a high-intensity forming operation so as to secure the members to one another with the layer of lubricating material retained therebetween.

---

Figure 1:
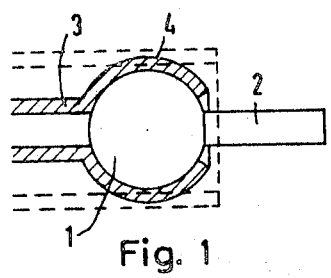

Our invention relates to method for producing a rotary joint between at least two members of rotationally symmetrical construction at the joint.

The production of rotary junctions between two rotationally symmetrical members, especially a ball-and-socket joint, is very difficult because numerous complex machining operations are necessary therefor. Particular difficulty is encountered in trying to adhere to accurate spacing or clearance between the cooperating members, which is of considerable significance for maintaining a good friction-free joint. Furthermore, if the joints are to have no degree of freedom in the axial direction, it has heretofore been found necessary to construct them of a number of parts.

It is accordingly an object of our invention to provide method of producing a rotary joint between two rotationally symmetrical members which avoids the aforementioned problems heretofore encountered and which, more particularly, does not require complex machining or construction of many parts.

With the foregoing and other objects in view, we provide in accordance with our invention a method of producing such a rotary joint wherein a high-power or high-intensity forming process, more particularly a magnetic forming process, secures one of the members of the joints to or mounts it on the other member by deforming the one member on or around the other member. The medium in which the member to be deformed is placed can be an oil, fat, wax, or the like, or a material which is easily removed by etching or vaporizing. By high-intensity forming is meant those methods whereby stored energy is exerted on the workpiece in a very short time period compared to the time-consuming conventional methods. Hydro-spark methods and explosion-deforming methods have also become known in addition to magnetic-forming methods. In magnetic-forming methods, pulsating magnetic fields of high intensity are employed for deforming the workpiece by discharging a capacitor through a coil. The deformation can then take place directly when, for example, the workpiece is made of iron and directly responds to the field intensity of the coil, or indirectly by applying the field to a driver or field shaper which in turn acts on the workpiece to deform it.

The high-intensity forming operation such as magnetic-forming or magnetic pulse forming and the apparatus for effecting the same are not described or illustrated herein since they are known as such. Reference may be had, for example, to U.S. Patent No. 2,976.907 and to the article "Magnetic-Pulse Forming" by D. F. Brower, published as Paper No. 479B by Society of Automotive Engineers, Inc., 485 Lexington Avenue, New York, N.Y. 10017 (particularly FIG. 3 thereof).

If a cylindrical tube, for example, is slid over a ball member and the tube is compressed by means of high-speed or high-intensity deforming process onto the ball member, a rigid joint is consequently formed. It has been found that with the prior application of a lubricant film on the surface of the ball, the lubricant is not squeezed out by the high-deforming speed so that a trouble-free ball-and-socket joint is then formed. The amount of play between both cooperating members is solely predetermined by the previously applied lubricant layer. In this manner, all possible types of joints can be produced.

Other features which are considered as characteristic for the invention are set forth in the appended claims.

Although the invention is illustrated and described herein as method for producing a rotary joint between at least two members having a rotationally symmetrical construction at the joint location, it is nevertheless not intended to be limited to the details shown, since various modifications and changes may be made therein without departing from the spirit of the invention and within the scope and range of the equivalents of the claims.

Figure 2:
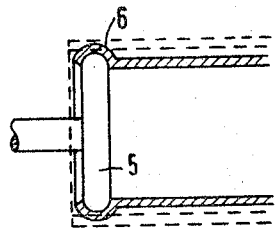
Figure 3:
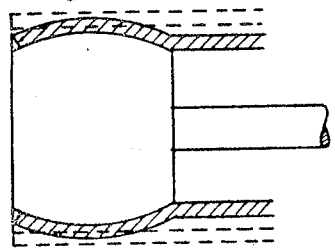

The method of our invention, however, together with additional objects and advantages thereof will be best understood from the following description when read in connection with the accompanying drawings, in which:

FIGS. 1 to 3 are diagrammatic longitudinal views of three different types of joints formed in accordance with the method of our invention.

Referring now to the drawings and first particularly to FIG. 1 thereof, there is shown, for example, a ball-and-socket joint wherein a member 2 formed with a ball head 1 is connected with a tubular member 3 which is provided with an end portion surface area 4 which is accommodated to the peripheral surface of the ball head 1. Both members 2 and 3 are universally pivotable relative to one another. The original shape of cylindrical tube 3 before being subjected to a high-intensity forming operation in accordance with the invention is shown in dotted lines.

FIG. 2 shows another embodiment of a joint produced by the method carried out in accordance with the invention of the instant application, wherein a disc 5 with a rounded edge is bordered by curved-flange extension 6 of a cylindrical member, a rotary joint being formed accordingly after a lubricating film is interposed between the adjacent surfaces of the two members.

The longitudinal cross section of both cooperating rotationally symmetrical members can have almost any desirable shape. For example, the longitudinal section can be generally elliptical in shape, as shown in FIG. 3, and can also be rectangular with rounded corners or the like. In order to provide the joint with a longer lifespan, it may be advisable to make the nondeforming member of a material having the characteristic of bearing metal, such as sintered metal, for example. Similarly, the nondeforming member can be provided with a recess or the like for retaining lubricant therein.

We claim:

1. Method of producing a lubricated rotary joint between at least two members having rotationally symmetrical construction at the joint location, which comprises coating at least one of the members with a layer of lubricating material having a thickness corresponding to the spacing between the two members and deforming one of the members about the other by means of a high-intensity forming operation so as to secure the members to one another with the layer of lubricating material retained therebetween.

2. Method according to claim 1, wherein the layer of material is a film.

3. Method according to claim 2, wherein the film consists of liquid lubricating medium.

4. Method according to claim 1, wherein layer consists of solid lubricating medium.

5. Method according to claim 1, wherein the high-intensity forming operation is a magnetic-forming process.

6. Method according to claim 1, wherein the high-intensity forming operation is applied directly to the deforming member in a direction transverse to the axis of symmetry thereof.

7. Method according to claim 1, wherein the high-intensity forming operation is applied indirectly to the deforming member in a direction transverse to the axis of symmetry thereof.

8. Method according to claim 1, wherein the one member is mounted on the other member when it is deformed.

9. Method according to claim 1, wherein the non-deforming member is made of material having the properties of bearing material.

10. Method according to claim 9, wherein the material of the non-deforming member is sintered metal.

11. Method according to claim 1, wherein lubricant is supplied to a recess formed in one of the joint members.

References Cited

UNITED STATES PATENTS

| | | |
|---|---|---|
| 2,462,138 | 2/1949 | Spangenberg. |
| 2,947,063 | 8/1960 | Teeple. |
| 2,976,907 | 3/1961 | Harvey et al. |

THOMAS H. EAGER, Primary Examiner

U.S. Cl. X.R.
29—421, 441, 443